May 12, 1964

E. W. JUNTUNEN 3,132,701

HORIZONTAL EARTH BORING MACHINE

Filed July 28, 1961

INVENTOR.
ERNEST W. JUNTUNEN,
BY

McMorrow, Berman & Davidson
ATTORNEYS.

May 12, 1964  E. W. JUNTUNEN  3,132,701

HORIZONTAL EARTH BORING MACHINE

Filed July 28, 1961  3 Sheets-Sheet 2

INVENTOR.
ERNEST W. JUNTUNEN,
BY
McMorrow, Berman & Davidson
ATTORNEYS.

May 12, 1964 E. W. JUNTUNEN 3,132,701
HORIZONTAL EARTH BORING MACHINE
Filed July 28, 1961 3 Sheets-Sheet 3

INVENTOR.
ERNEST W. JUNTUNEN,
BY
McMorrow, Berman & Davidson
ATTORNEYS.

United States Patent Office 3,132,701
Patented May 12, 1964

3,132,701
HORIZONTAL EARTH BORING MACHINE
Ernest W. Juntunen, 48 Trimountain Ave.,
South Range, Mich.
Filed July 28, 1961, Ser. No. 127,656
1 Claim. (Cl. 173—24)

This invention relates to improvements in boring machines and, more specifically, the invention pertains to devices for tunnelling or boring horizontally.

One of the primary objects of this invention is to provide a boring machine which is adapted to bore substantially horizontal holes in the ground beneath streets, embankments, alleys, driveways, sidewalks, and the like.

Another object of this invention is to provide a boring machine for making horizontal bores in the ground while simultaneously therewith laying pipe therein.

Another object of this invention is to provide an earth boring machine of the type generally referred to above with means for adjusting the angularity of the boring tool and pipe as the boring operation is taking place.

Still another object of this invention is to provide a boring device for forming horizontal bores, and wherein antifriction means is provided for the cutting tool.

A still further object of this invention is to provide a device of the type described together with means for detachably connecting the same to a source of power.

Still another object of this invention is to provide a machine for horizontal boring and the simultaneous laying of pipe therein, together with means for supporting the pipe and boring tool as the boring operation is carried out.

This invention contemplates, as a still further object thereof, the provision of a machine for boring horizontal holes in the earth, of the type generally described supra, the machine being non-complex in construction and assembly, relatively inexpensive to manufacture, and which is durable in use.

Other and further objects and advantages of the instant invention will become more evident from a consideration of the following specification when read in conjunction with the annexed drawings, in which.

Figure 3:
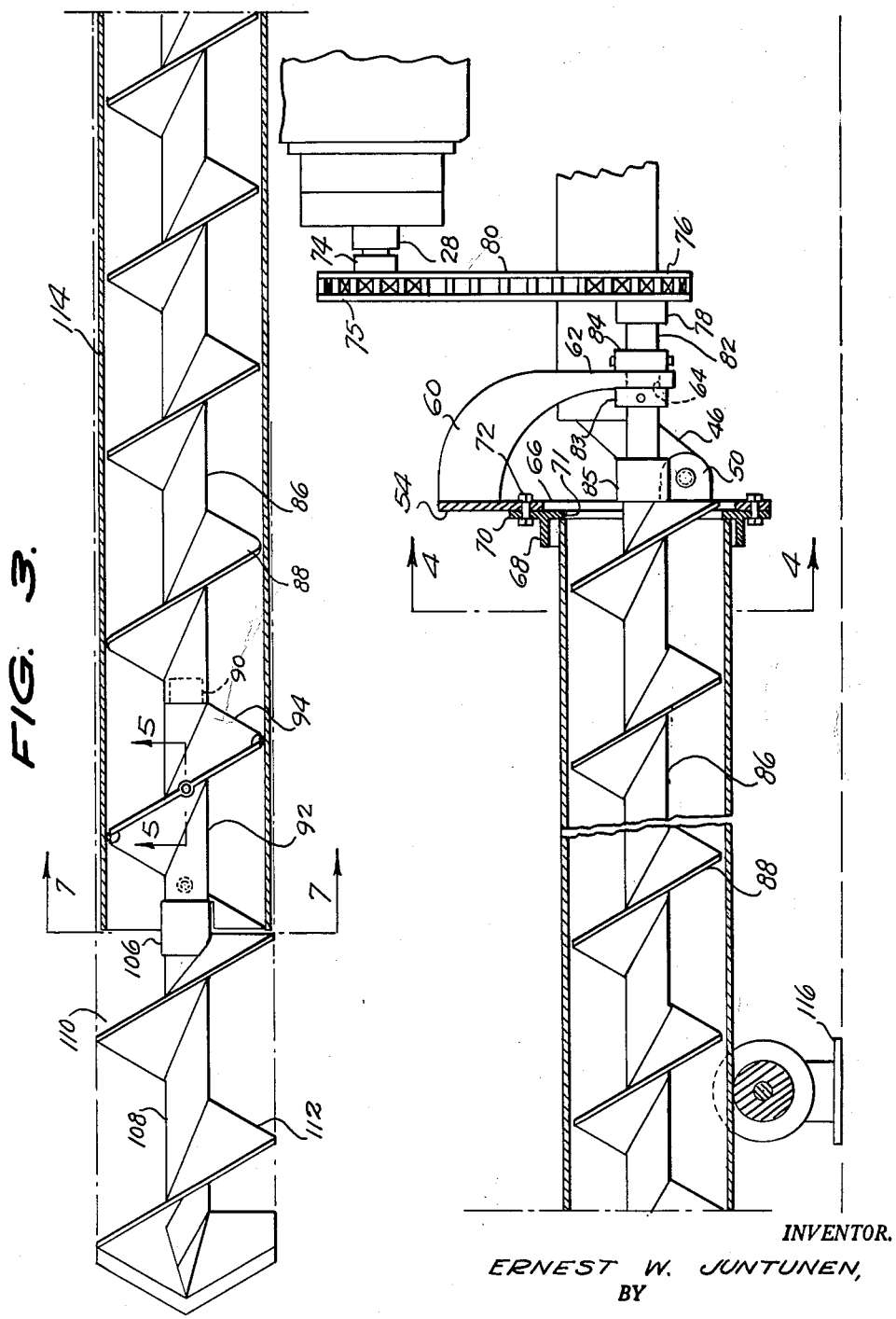
FIGURE 3 is an enlarged detail cross-sectional view, FIGURE 3 being taken substantially on the horizontal plane of line 3—3 of FIGURE 1, looking in the direction of the arrows.
Figure 5:
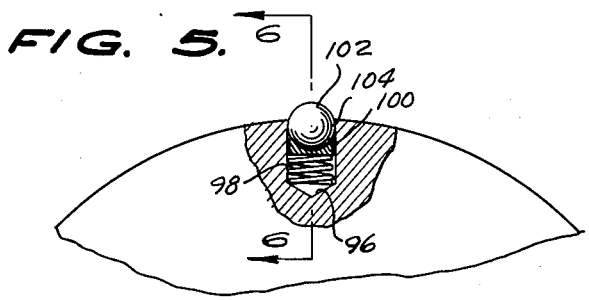
FIGURE 5 is a fragmentary side elevational view of one of the conveyor flights, FIGURE 5 being taken substantially on the horizontal plane of line 5—5 of FIGURE 3, looking in the direction of the arrows.
Figure 6:
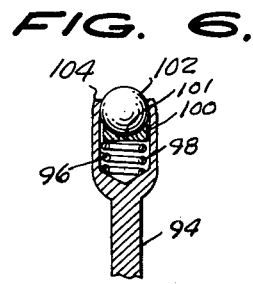
Figure 7:
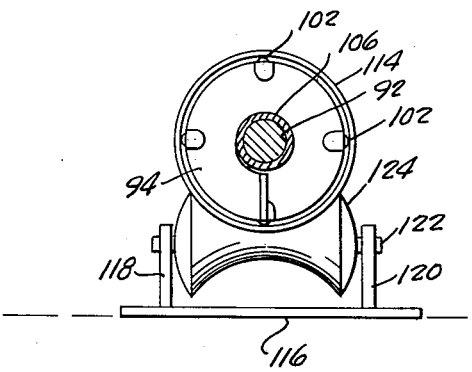

FIGURE 6 is a fragmentary detail cross-sectional view of the anti-friction means shown in FIGURE 5, FIGURE 6 being taken substantially on the vertical plane of line 6—6 of FIGURE 5, looking in the direction of the arrows; and FIGURE 7 is an end elevational view, partly in cross section, FIGURE 7 being taken substantially on the vertical plane of line 7—7 of FIGURE 3, looking in the direction of the arrows.

Figure 1:
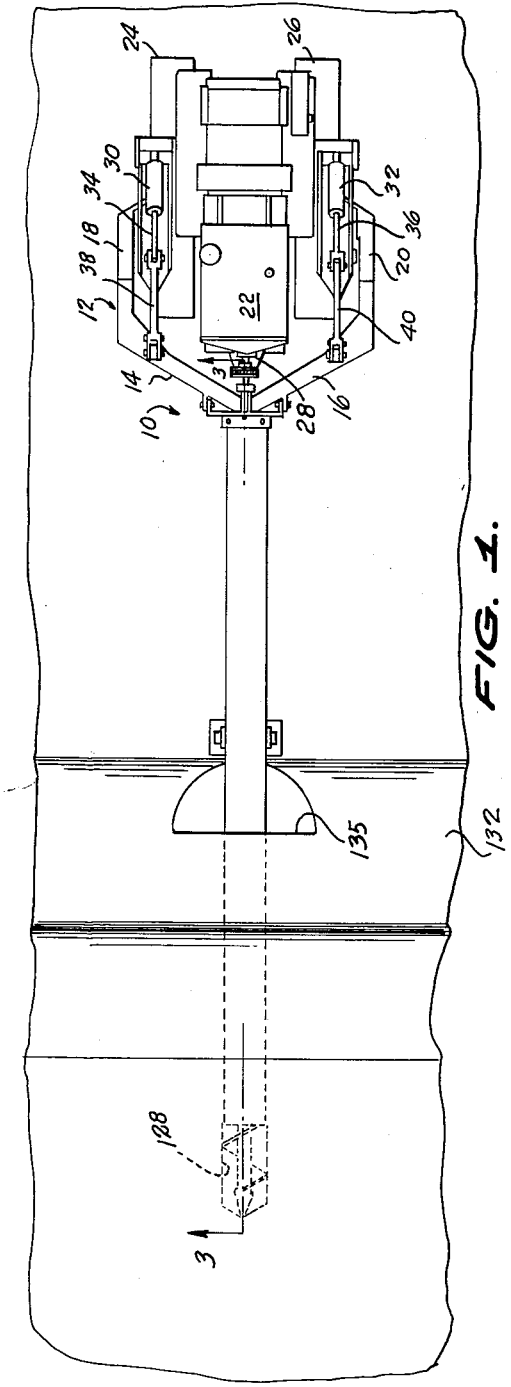
FIGURE 1 is a top plan view of a boring machine for making horizontal bores, the machine being constructed in accordance with this invention, FIGURE 1 further illustrating the machine in an operative position.
Figure 2:
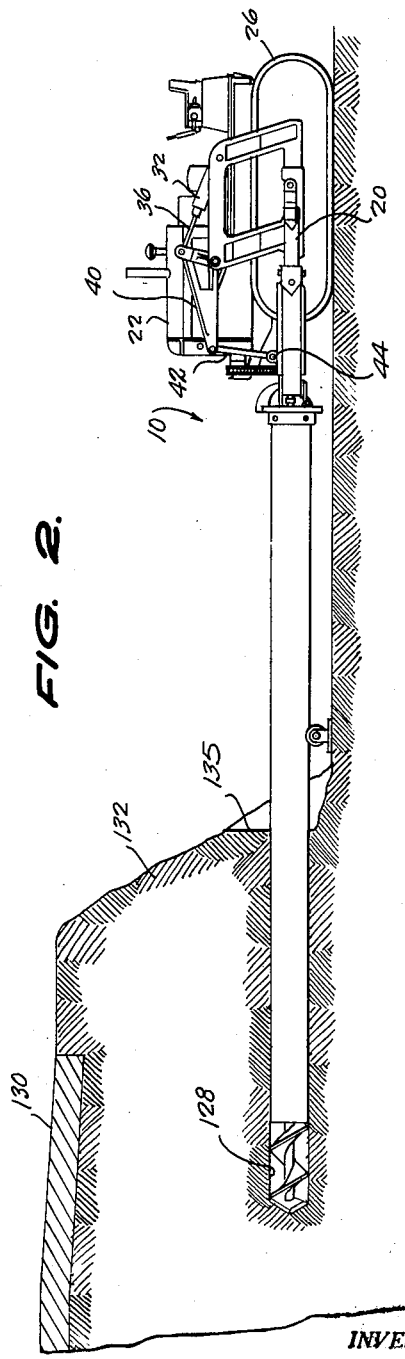
FIGURE 2 is a side elevational view of the machine shown in FIGURE 1.

Referring now more specifically to the drawings, and especially to FIGURES 1 and 2 thereof, reference numeral 10 designates, in general, a boring or tunnelling machine constructed in accordance with the teachings of this invention. Reference numeral 12 designates a conventional bulldozer equipped with the usual forwardly-converging frame members 14, 16, the latter being pivotally connected to chassis side frame members 18, 20.

The bulldozer 12 includes the standard type motor or engine 22 for supplying motive power to the caterpillar treads 24, 26, and to provide a source of power for the forwardly-projecting power take-off shaft 28. On opposite sides of the bulldozer 12 are pivotally supported the customary hydraulically-operated cylinders 30, 32, having piston rods 34, 36, respectively. The rods 34, 36 are pivotally connected to links 38, 40 which, in turn, are pivotally connected to levers 42 (only one being shown, see FIGURE 2), and each of the levers 42 is pivotally connected as at 44 to one of the forward frame members 14, 16. The hydraulic cylinders are, of course, operable through the aforementioned links and levers to cause the raising and lowering of the forward frame members 14, 16.

All of the foregoing specification is conventional in the art of buldozing, and a more detailed description thereof is not believed to be essential, since the bulldozer 12 forms no part of the instant invention.

Figure 4:
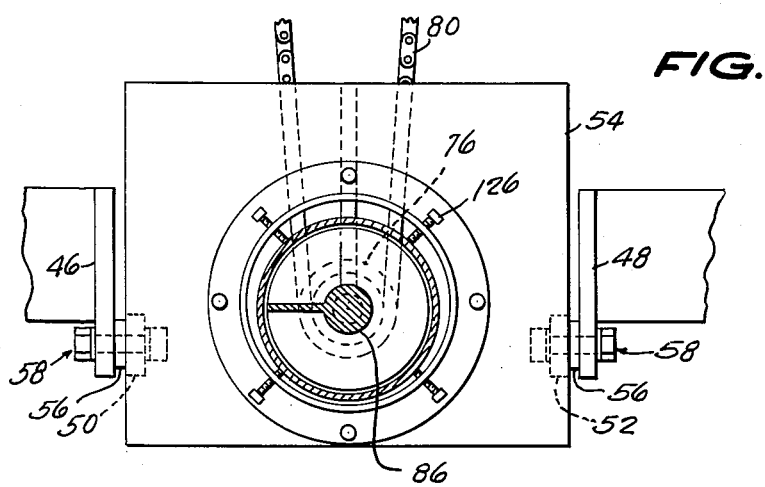
FIGURE 4 is a detail cross-sectional view, FIGURE 4 being taken substantially on the vertical plane of line 4—4 of FIGURE 3, looking in the direction of the arrows.

To the forward frame members 14, 16 are connected a pair of identical forwardly and downwardly-extending, laterally-spaced, and substantially parallel connector lugs 46, 48 (see FIGURES 3 and 4) to which are fixedly secured one of the ends of a pair of links 50, 52, respectively, the other ends of the links 50, 52 being rigidly secured to or integral with a normally vertically-extending, substantially rectangular pusher and retractor plate 54 at the opposed side edges thereof. Reference numeral 56 denotes a washer normally interposed between the juxtaposed lugs and links 46, 50 and 48, 52, respectively. Any conventional securing means 58 may be employed. The plate 56, intermediate its side edges and adjacent the upper end thereof, has rigidly secured to the rear side thereof a laterally-projecting arcuately-shaped flat gusset plate 60 which extends downwardly and terminates at its lower end in a shaft journal plate 62 apertured at 64. As is seen in FIGURE 3, the journal plate 62 is substantially perpendicular to the main body of a gusset plate 60. The plate 54 is also formed with an off-center cylindrical opening 66 to which further reference will be made.

Reference numeral 68 denotes a substantially cylindrical pipe adapter having a laterally and outwardly-turned circumferential flange 70, and a laterally and inwardly-extending annular abutment plate 71 integral and coplanar therewith. The flange 70 is connected to the front side of the plate 54 by conventional means 72 and it is seen in FIGURE 3 that the adapter 68 is in registry with the opening 66, but is not concentric with respect thereto.

The power take-off shaft 28 is connected to the hub 74 of a conventional drive sprocket 75 which is vertically aligned with a driven sprocket 76 (see FIGURE 3) having a hub 78. A driving connection is established between the two sprockets by means of an endless chain 80 which is trained therearound.

One end of a driven shaft 82 is connected to the hub 78, and the other end extends through the opening 64 in the journal plate 62. As is seen in FIGURE 3, thrust collars 83, 84 are secured on the shaft 82 on opposite sides of the journal plate 62. The other end of the shaft 82 is detachably connected, by a coupler 85, with one end of shaft 86. The shaft 86 is rigidly secured to a helicoidal conveyor flight 88 which, as will be set forth below, performs a given function when the machine is in operation.

The outer end of the shaft 86 has detachably connected thereto, as at 90 (see FIGURE 3), the inner end of a shaft 92 that carries a second helicoidal flight 94, the peripheral edges of which (see FIGURES 5 and 6), at spaced intervals therearound, are bored or otherwise formed to provide ball bearing receiving sockets 96. The sockets 96 each has seated therein a helicoidal spring 98, the upper ends of each spring 98 abutting against the lower side of a bearing seat 100. The seats 100 are concave at their respective upper sides to receive ball bearings 102 therein, after which the upper ends of the sockets 96 are peened over at 104 to prevent displacement of the bearings. It will be understood, of course, that the springs 98 constantly bias the bearings 102 for movement outwardly of their respective sockets.

To the outer end of the shaft 92 is connected, by coupler 106, the inner end of a shaft 108 of a drill head section 110, the drill head section 110 having a drill head 111 and a following helicoidal flight of but two complete convolutions 112.

The helicoidal conveyor flights 88, 94 are adapted to be received within a pipe or conduit 114, and their combined axial lengths substantially equal the axial length of the conduit 114. The outer diameters of the helicoidal conveyor flights 88, 94 are slightly smaller than the internal diameter of the conduit 114, while the outer diameter of the drill head section 110 is the same as the outer diameter of the conduit 114.

A support for the conveyor flights 88, 94, and the drill head section 110, as well as for the conduit 114 is provided when setting up the machine 10 for operation and during the actual operation thereof. The support comprises a substantially rectangular base plate 116 having an upstanding bracket 118, 120 at its respective ends which support the opposed ends of a shaft 122 on which is mounted for rotation a roller 124 having a substantially hyperbolic configuration.

The inner end of the conduit 114 extends through the adapter 68 and engages against the abutment plate 71. Positioning and retaining bolts 126 extend through the adapter 68 and engage against the conduit 114 adjacent its inner end.

Having described in detail the component elements of this invention, the method of assembly and mode of operation of the device will now be set forth.

Ordinarily, pipe lengths are of standardized 20-foot lengths. However, the pipe can be cut to any desired length. After the pipe or conduit 114 has been selected, the conduit 114 is then placed on supporting blocks (not shown).

Assuming that the pusher and retractor plate 54 has been mounted on the bulldozer 12 in the manner described above, and that the driven shaft has been connected to the hub 78 of the sprocket 76, a selected length of conveyor flighting 88 has its shaft 86 coupled at 85 to the shaft 82, a selected length of the conveyor flight 94 is then connected with the conveyor flight 88. As has been mentioned before, it is desirable that the axial lengths of the conveyor flights should be substantially equal to the axial length of the conduit or pipe 114.

With the aid of the bulldozer 12, the conveyor flights 88, 94 are now inserted within the selected conduit 114. Thereafter, the drill head section 110 is connected through coupling 106 with the shaft 92, and the machine 10 is ready for operation.

It will be understood that the conveyor flights become fully inserted within the conduit 114, the inner end of the conduit 114 will pass through the adapter 68 until it engages the abutment plate 71, as shown in FIGURE 3. At that time, the bolts 126 are tightened against the exterior side of the conduit 114.

The conduit 114 is now lifted from the blocks and pushed on the roller support 124 in line with the direction of the bore 128 to be made beneath a road or sidewalk 130. In the event the earth or ground 132 has a sloping grade, it is advisable to remove some of the facing earth to form a substantially vertical face 135 before starting the boring operation.

Assuming that all of these preparations have been made, and the power take-off shaft 28 is rotating, the chain 80 will drive the sprocket 76 and consequently, the driven shaft 82, which, through its connections with the shafts 86, 92 and 108 will effect the rotation of the conveyor flights, as well as the drill head section 110. The drill head section 110 enters the earth at the surface 135 and bores inwardly. It is assumed, of course, that the operator of the bulldozer 12 is controlling the same to move it forwardly at the same time. The pusher plate 54 together with the adapter 68 force the conduit 114 to follow immediately behind the drill head section 110. As the drill head section 110 is rotated, the cuttings are conveyed back rearwardly to the conveyor flights 94 and 88, in that order, and are finally discharged at the open inner end of the conduit 114. The helicoidal flights 88, 94 normally have a slightly smaller outside diameter than the inside diameter of the pipe or conduit 114 to reduce friction or drag. It has been found, however, that much of the friction or drag still residing may be substantially eliminated by the use of the helicoidal conveyor flight 94 with its anti-friction bearings 102. These bearings tend to support the longer flight 88 in its normal spaced relation relative to the inner surface of the conduit 114.

In the event the distance to be bored requires more than one length of conduit or pipe 114, additional lengths thereof could be added through the simple expedient of disconnecting the conduit 114 from the adapter 68, and disconnecting the coupler 85 from the shaft 86. The bulldozer 12 is then moved axially away from the conduit 114 a sufficient length to permit a second length of conveyor flight to be connected to the coupler 85 at one end, the other end of the added conveyor flight being releasably secured, by conventional coupling means, to the original shaft 86 and flight 88. The second section of the conduit 114 may be then fitted over, in the manner described above, and the exposed end of the pipe or conduit 114 is then connected to one of the ends of the added pipe section by means of a butt weld or other type of connection.

When the boring operation has been completed and the drill head section 110 protrudes from the opposite side of the embankment 132, the operator disconnects the drill head section 110 via the coupler 106, and the operator of the bulldozer then slowly withdraws the conveyor flights 88, 94 from within the conduit 114.

It is sometimes necessary that the bore 128 be other than horizontal. To effect a change in pitch, it is only necessary for the operator to actuate the hydraulic cylinders 32 to raise or lower the adjacent end of the conduit 114. In the latter case, the support roller 124 is removed from beneath the conduit 114.

Having described and illustrated one embodiment of this invention in detail, it is to be understood that the same is offered merely by way of example, and that this invention is to be limited only by the scope of the appended claims.

What is claimed is:

A boring or tunnelling device for boring into and laying a conduit in an embankment below the upper surface thereof, said device comprising a power-driven vehicle having a chassis and chassis front frame members, said power-driven vehicle having a power take-off shaft, an apertured pusher and retractor plate fixedly secured to said frame members in an upright position, a gusset plate fixedly secured to the upper end of said pusher and retractor plate and projecting laterally and downwardly therefrom to terminate in a journal plate, an elongated shaft having a conveyor flight fixedly secured thereto, a conduit enclosing said conveyor flight and supporting said flight therein, said conduit being substantially co-extensive, axially, with said conveyor flight, means detachably connecting one end of said conduit with said pusher and retractor plate, means detachably connecting that end of said conveyor shaft adjacent said pusher and retractor plate with said power take-off shaft, said power take-off shaft being journaled in said journal plate, and thrust collars mounted on said power take-off shaft on opposite sides of said journal plate.

References Cited in the file of this patent

UNITED STATES PATENTS

| | | |
|---|---|---|
| 714,812 | Mann et al. | Dec. 2, 1902 |
| 1,399,738 | Bonelli | Dec. 13, 1921 |
| 1,633,843 | Bostic | June 28, 1927 |
| 1,932,068 | Englebright et al. | Oct. 24, 1933 |
| 2,647,726 | Kirk | Aug. 4, 1953 |
| 2,659,916 | Lewis | Nov. 24, 1953 |
| 2,675,213 | Poole et al. | Apr. 13, 1954 |
| 2,834,576 | Ivey | May 13, 1958 |
| 2,839,271 | Kandle | June 17, 1958 |
| 2,859,014 | Berner | Nov. 4, 1958 |
| 3,038,546 | Blubaugh et al. | June 12, 1962 |

FOREIGN PATENTS

| | | |
|---|---|---|
| 367,116 | Germany | Mar. 22, 1921 |